Patented July 27, 1954

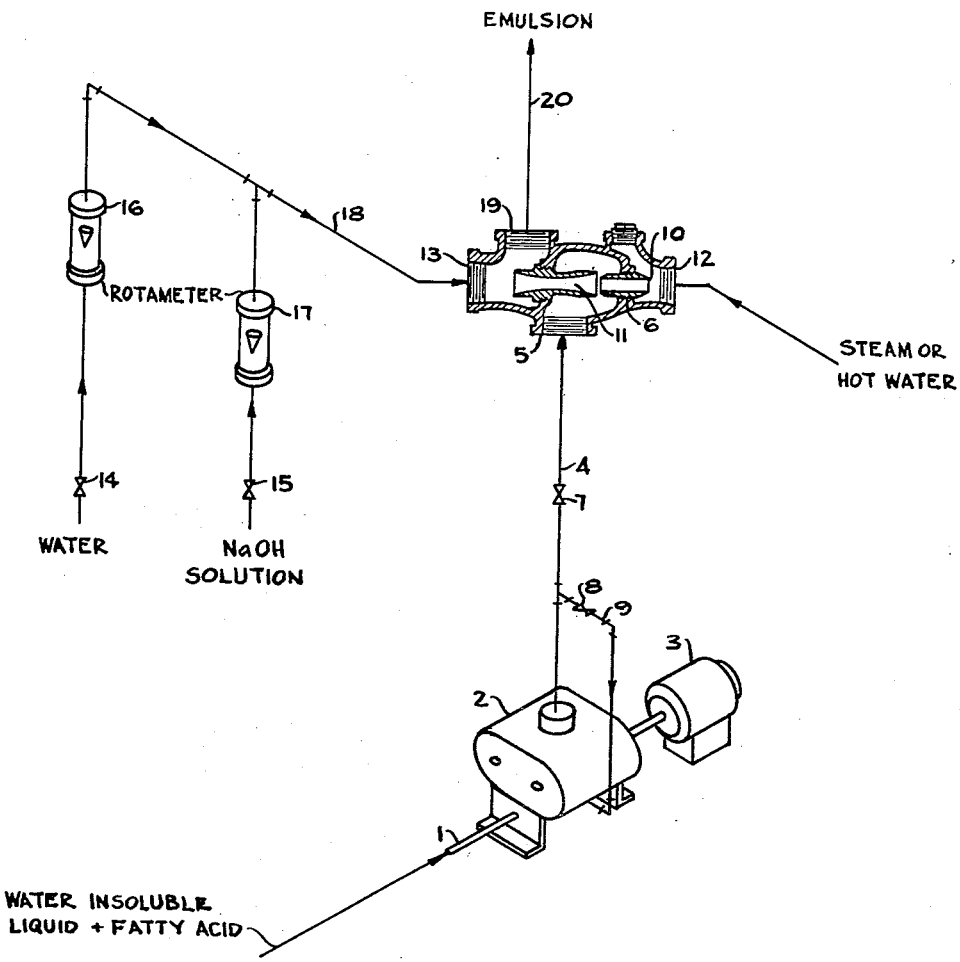

2,684,949

UNITED STATES PATENT OFFICE 2,684,949

METHOD OF PRODUCING DISPERSIONS OF IMMISCIBLE LIQUIDS OR SOLIDS IN A LIQUID MEDIUM

Frank M. McMillan, Orinda, and Robert D. Sullivan, Concord, Calif., assignors to Shell Development Company, Emeryville, Calif., a corporation of Delaware Application April 12, 1952, Serial No. 282,074

9 Claims. (Cl. 252—314)

This invention relates to the dispersion of liquids and/or solids in liquid media in which the liquids and solids are insoluble or substantially insoluble. It deals with an improved method of obtaining an intimate mixture of two or more immiscible phases which is highly stable to subsequent separation.

A wire variety of different dispersion methods have been proposed and a number of different systems are in use. As a general rule, the quality of the dispersion, particularly in regard to stability, is highly dependent in these methods on the degree of shear afforded during dispersion and upon the skill of the operator. In the production of emulsions in particular, it is necessary in prior methods to test each system carefully before undertaking emulsification and adjust the emulsification technique to compensate for the variations in the viscosity and viscosity index of the oil phase as well as for the innate differences in emulsibility of the material being dispersed. Difficulty has also been experienced in translating procedures which are successful on the laboratory scale to the scale required for commercial application.

It is an object of the present invention to provide a method of producing dispersions which avoids the foregoing and other limitations of prior dispersion methods. Another important object of the invention is to provide a commercially feasible method of preparing fine dispersions of consistent high stability both in storage and dilution. Another object is the provision of a dispersion method in which continuous throughput of the constituents can be readily maintained at commercially practical rates in an economical manner. Still another object is to reduce the consumption of dispersing agents in the preparation of finely dispersed emulsions and suspensions. A further object is to produce high quality dispersions with simple apparatus free from maintenance difficulties. A special object is the provision of a method of emulsifying hydrocarbon or fatty oils with water in a more efficient manner. Still other objects and advantages of the new process of the invention will be apparent from the following description in which the use of the new process for the preparation of aqueous emulsions of viscous hydrocarbons especially useful as plasticizers for natural or synthetic rubber latexes will be described by way of example because of the commercial importance of this application of the invention. It will be understood, however, that this application is intended to be illustrative only, and that the invention is applicable with equal success to the production of a wide variety of other emulsions of this and other types useful in the manufacture of cosmetics, mayonnaise, paper sizes, roofing and road emulsions, and a great many other purposes, as well as the formation of suspensions of solids in liquids and other useful dispersions.

In accordance with the invention, aqueous dispersions are produced by atomizing a mixture of the material to be dispersed together with an acid capable of forming a surface-active salt which is a dispersing agent for the material to be dispersed, and quenching the atomized mixtures in water containing a base which reacts under the operating conditions with the acid to form said surface-active salt. The attached drawing shows, schematically, one arrangement which has been found to be particularly advantageous for the production of stable emulsions from viscous water-insoluble liquids such as hydrocarbons. The drawing shows, in section, a preferred form of steam jet for carrying out the atomization and, for purposes of simplifying the description, indicates the use of fatty acid and sodium hydroxide as starting materials for the surface-active salt emulsifier used. Other suitable forms of jet atomizers and other acids and bases can be used, however, without departing from the invention, as will be made clear hereinafter.

As shown in the drawing, the water-insoluble liquid to be emulsified, in admixture with the proper amount of surface-active salt-forming acid, is fed via line 1 to a suitable pump 2, shown as a gear pump because of the special advantage which this type of pump has in handling viscous liquids, although other suitable pumping means or even gravity flow may be used depending upon the nature of the material to be dispersed. Pump 2 can be actuated by any suitable means such as the motor 3. The mixture of liquid to be emulsified and surface-active salt-forming acid is delivered by line 4 to inlet 5 of jet atomizer 6. Control of the rate of flow of the mixture in line 4 may be achieved by varying the speed of motor 3, or by use of a constant speed motor and adjustment of valves 7 and 8 so as to regulate the flow in by-pass line 9. Jet mixer 6 is provided with two interior nozzles, 10 and 11, operated in series in such a manner as to provide a zone of reduced pressure at inlet 5 of the jet. Steam, or hot water with or without steam, is introduced through inlet 12 and, passing through nozzle 10, forces the liquid to be emulsified together with the added free surface-active salt-forming acid into the inlet of nozzle 11. At the outlet of nozzle 11 the mixture meets a stream of water and base introduced through inlet 13. The amounts of water and sodium hydroxide solution fed are controlled by valves 14 and 15 in conjunction with suitable measuring devices such as rotometers 16 and 17 connected with line 18. The amount of water used is chiefly determined by the concentration desired in the final emulsion which is withdrawn through outlet 19 by line 20. The amount of sodium hydroxide supplied must be so regulated as to insure neutralization of the acid introduced with the water-insoluble liquid to be emulsified and formation in situ therein of sufficient surface-active salt emulsifier. For accurate proportioning of base to acid, the solution of base may advantageously be fed by a pump provided with a by-pass system such as is shown for the water-insoluble liquid-acid feed. It is a feature of the invention that, by this method of forming the surface-active salt emulsifier in situ in the water-insoluble liquid to be emulsified, fine emulsions of excellent stability can be obtained with materially less cost of emulsifier than by other methods.

There is apparently a cooperative effect of the jet atomization to produce very fine particles of the liquid to be emulsified and neutralization of their acid content to form a surface-active salt, the result being a more effective and efficient utilization of the emulsifying properties of the surface-active salt and formation of high quality emulsions in a simple manner with low power consumption. The oil phase atomized in nozzle 11 of the jet is mixed directly with the aqueous phase containing the base in the outlet section of the jet to form the emulsion at that point. A distinguishing feature of the method of the invention is the complete dispersion of all the oil phase as fine particles containing a surface-active salt-forming acid therein prior to reaction with a base to form such salt. Most advantageously, steam is used as the medium to force the oil phase through nozzle 11 of the jet. Not only is agitation provided by the shearing action of the steam upon the oil phase in the nozzle and by the impact of the steam and oil with an opposing stream of sodium hydroxide-containing water, but also the collapse of the steam through condensation, particularly at the nozzle outlet, contributes in an important way to the improved emulsification results which are obtained. For this reason, as well as to facilitate pumping of viscous mixtures, it is advantageous to preheat, by means not shown, the stream of water-insoluble liquid and added acid fed to inlet 5. The most desirable temperature to which to preheat this stream will vary with the nature of the liquid being emulsified and the temperature and amount of steam fed to the jet. It should be such that complete condensation of the steam does not take place on contact with the oil phase in the nozzle but that a steam-oil mixture contacts the water phase added at inlet 13.

Experience has shown that this system of emulsification is very flexible and can be successfully operated over relatively wide ranges of conditions without rendering the resulting emulsions unstable. For instance, in the emulsification of viscous hydrocarbons in water, it has been found that the pH of the emulsions could be varied safely from about 7.5 to about 12.5, and steam pressures from about 30 to about 120 p. s. i. g. could be used to operate the jet. As a rule, however, steam under pressure in the range of from 60 to 80 p. s. i. g. is preferred as it furnishes the maximum shear without overloading the interior of nozzle 11 of the jet. The ratio of oil phase to aqueous phase can also be varied to obtain emulsions of the oil-in-water type containing amounts of oil phase up to about 65% to 70% by weight of the emulsion. Further increases in the ratio of oil phase to aqueous phase led to emulsions of the water-in-oil type which were of the same high quality as the oil-in-water type of emulsions.

The foregoing ranges of operating conditions are especially suitable for the emulsification of hydrocarbons in water and particularly of the high molecular weight aromatic and naphthenic hydrocarbons which may or may not contain sulfur, nitrogen and/or oxygen. Such high molecular weight hydrocarbons are obtainable, for example, as residues and extracts from petroleum. Those obtained in the course of lubricating oil manufacture, for instance, are especially useful for the production of emulsions which are applicable as plasticizers for rubber and resins, as sizing agents for paper pulp, and the like. Included among such products are the various residual asphalts as well as the extracts obtained by treating petroleum fractions with sulfur dioxide, furfural, phenol, cresol, and the like. These hydrocarbons vary in viscosity from about 50 SSU at 210° F. up to more or less solid compositions softening at about 100° F. to 200° F. and having specific gravities (d 20/4) in the range of about 0.9 to about 1.05. They usually have initial boiling points of at least 250° C. at 1 mm. The same operating conditions can be successfully used, however, with other liquid to solid hydrocarbons or mixtures of predominantly hydrocarbon character whether composed chiefly of paraffinic, aromatic or naphthenic hydrocarbons or mixtures thereof. Emulsification of light petroleum fractions such as gasoline or kerosene is an important application of the process of the invention, especially in the preparation of agricultural spray compositions.

Instead of hydrocarbon oils, one can successfully use fatty oils and waxes in the new process to obtain dispersions thereof with water or other liquids in which they are incompletely miscible. Thus, the process is particularly advantageous and useful in the manufacture of mayonnaise and cosmetic creams and lotions. It can also be successfully applied in the emulsification of other water-immiscible liquids such as higher alcohols, ethers, esters, ketones, aldehydes, carboxylic acids, thio compounds, amines and other organic nitrogen compounds. Liquids of an inorganic character, such as silicones, etc., can likewise be used. The dispersion of solids can also be carried out by the process of the invention. Where low melting solids are to be dispersed, it is usually most convenient to carry out the process as described for the dispersion, taking care to maintain the temperature above the melting point of the solid until the dispersion has been completed. Upon cooling to below the melting point of the solid, a suspension which has a stability comparable to that of the liquid dispersions is obtained. For high melting solids, it is usually sufficient to use as feed to line 1 of the arrangement shown in the drawing an aqueous slurry of the finely divided solid to be dispersed, together with the surface-active salt-forming acid which has been chosen. This slurry must be kept actively agitated to prevent settling before it reaches the dispersion jet, but the dispersion which is withdrawn by line 20 is highly stable in both transportation and storage. In this way carbon black dispersions particularly effective for cold rubber latex compounding can be successfully produced on a large scale. Suspensions of clay and the like are other examples of successful applications of the new process.

It is feasible to produce non-aqueous suspensions and emulsions by the same method. By introducing the base supplied by line 18 as an anhydrous solution in the dispersing medium and using hot vapors of the dispersing medium for the feed to inlet 12, stable emulsions of an immiscible liquid supplied together with surface-active salt-forming acid by line 4 can be prepared. In this way it is possible to prepare dispersions of fatty acid soaps in lubricating oil which are highly effective as lubricating greases, for example.

Among the surface-active salt-forming acids which are useful for forming the surface-active salt in the dispersion process of the invention, those having 12 to 18 carbon atoms per molecule are preferred. Lauric, myristic, palmitic, stearic and oleic acids are especially suitable, as are the mixtures predominating in these acids obtainable from coconut, olive, palm, palm kernel and like oils, or from tallow, for example. Naphthenic acids, tall oil acids and the like are also useful in the process. While these acids have certain advantages, particularly with respect to availability and general utility, other suitable acids can be successfully used and, in some cases, may be more desirable for certain applications. In preparing dispersions with hard water, for instance, sea water, which causes precipitation of fatty acid soaps and hence may be undesirable, either due to the increased consumption of fatty acid which this would involve or the fact that such a precipitate interferes in the ultimate use of the dispersion, it may be more advantageous to use other surface-active salt-forming acids. Examples of such suitable acids are sulfonic acids, such as alkane or alkyl aromatic sulfonic acids having an alkyl group of 8 to 20, preferably about 10 to 16, carbon atoms. Secondary alkane sulfonic acids having the sulfonic acid group attached to a carbon atom near the end of the chain, preferably 2-alkane sulfonic acids, and primary alkane sulfonic acids or alkyl benzene sulfonic acids, especially dodecyl, tetradecyl and pentadecyl benzene sulfonic acids, are particularly useful. Other suitable synthetic detergent-forming acids are those which form alkyl sulfates, sulfated and sulfonated amides, sulfated and sulfonated esters, sulfated and sulfonated amines and the like, many examples of which are given in the article by John W. McCutcheon in the November 1947 issue of "Chemical Industries," pages 811 to 824. Any suitable soap-forming base may be used to react with the foregoing acids. Inorganic bases such as the alkali metal hydroxides, particularly sodium or potassium hydroxide, or ammonia are especially useful, but alkaline earth metal oxides or hydroxides, especially magnesium or calcium hydroxides, can be used when employing acids which form soluble alkaline earth metal salts. It is also feasible to use organic bases such as amines, for instance, ethanolamine. Organic bases are often advantageous in the preparation of dispersions in anhydrous media.

The amounts of surface-active salt-forming acid and base which it will be desirable to supply to the system will vary with the nature of the material being dispersed and the liquid medium in which it is being suspended. As a general rule, between about 0.5% and 5% of such acid has been found to be sufficient, and for the emulsification of hydrocarbons in water usually not more than 3% is necessary. Sufficient base should be used to substantially saponify the acid at the point of contact of the atomized stream and the base-containing solution at the outlet of the atomizing jet. Where the intended use of the dispersion makes a pH greater than 7 acceptable, it is often advantageous to use a stoichiometric excess of base over acid in the process. However, equivalent amounts of acid and base or an excess of acid can also be employed.

The following examples illustrate typical methods of carrying out the new process and show some of its advantages:

Example I

Using a jet of the type illustrated in the drawing having an outlet 19 threaded for a ½-inch pipe, three different types of rubber plasticizers were emulsified with water using 2% by weight of oleic acid based on the weight of plasticizer and a 2% aqueous sodium hydroxide solution for reaction with the oleic acid. The characteristics of these viscous hydrocarbon plasticizers were as follows:

| Trade name of plasticizer | Dutrex 20 | Dutrex 15 E | Circosol 2xH |
|---|---|---|---|
| Type of hydrocarbon | Aromatic | Asphaltic | Naphthenic |
| Sp. Gravity, 60° F | 1.038 | 1.001 | 0.946 |
| Viscosity, S. U. S. at 210° F | 108 | 233 | 84 |
| Pour point, ° F | 55 | 50 | |
| Aromatics by silica gel absorption, percent | 95 | 79 | 48 |

The plasticizer and oleic acid were premixed and heated, then pumped by a gear pump to the jet which was supplied with steam at 60 to 80 p. s. i. g. The sodium hydroxide solution was injected into the water supply by means of another gear pump provided with a similar by-pass system and the mixture at 18° C. fed to the outlet of the jet nozzle. The operating conditions were as follows:

| | Plasticizer | | |
|---|---|---|---|
| | Dutrex 20 | Dutrex 15E | Circosol 2xH |
| Oil Phase Feed: | | | |
| Temp., ° C | 65 | 78 | 52 |
| Feed rate, parts by wt | 100 | 100 | 100 |
| Water Feed Rate, parts by wt | 84 | 68 | 85 |
| NaOH Soln. Feed Rate, parts by wt | 10.5 | 11.4 | 11.8 |
| Temp. at Jet Outlet, ° C | 66 | 72 | 66 |
| Emulsion: | | | |
| pH | 9.9 | | 10.2 |
| Hydrocarbon content, percent wt | 51.4 | 56.0 | 50.8 |
| Rate of Production, gals./min | 4.5 | 4.5 | 5.0 |

The emulsions obtained in all three cases were very stable, both to storage and to dilution with tap water. After aging for periods up to six months, their stability was unimpaired, the only visible change being a very light creaming or settling which was completely removed by only mild agitation. For comparison, emulsions of Dutrex 20 and Dutrex 15E were prepared by a conventional phase inversion technique, using a high speed, high shear stirrer (Eppenbach Homomixer) operated at 6000–8000 R. P. M. The plasticizer, together with 2% of oleic acid, was heated to 80° C.–85° C. and an aqueous solution of NaOH in the proportions used above, and at the same temperature as the plasticizer, was slowly added under constant agitation of the Homomixer. Emulsions were made having the same hydrocarbon content as those prepared by the jet method described above. On standing, 27% by volume of the original emulsion separated as a lower hydrocarbon layer from the Dutrex 20 emulsion, whereas there was no visible change in the same period in the same emulsion prepared according to the invention. In the case of the Dutrex 15E emulsion, there was less separation on standing, but upon dilution to about 10% hydrocarbon content an upper hydrocarbon layer separated corresponding to about 23% by volume of the original emulsion. Correspondingly diluted Dutrex 15E emulsions prepared by the new method remained entirely stable. The settled fractions of the emulsions prepared by the phase inversion method coalesced after standing only about a week and could not be redispersed.

Microscopic examination of the emulsions prepared according to the invention showed that the average particle is less than 2 microns in diameter and that a substantial fraction of the particles are smaller than 1 micron. Only an occasional particle over 4 microns in diameter was found.

While the emulsions prepared by forming the emulsifying agent in situ in the jet are stable to storage, handling and water dilution, blends with rubber latex can be coagulated readily and completely by addition of sodium chloride and sulfuric acid solutions as practiced by the rubber industry. The serum from the coagulant is clear and free from suspended material, showing that all the plasticizer has been transferred to the rubber.

Equally good results are obtained in the emulsification of pine oil, coal tar pitch, and fatty oils, in particular soya bean oil and sardine oil, under the foregoing conditions.

*Example II*

In the apparatus described in Example I a series of emulsions of Dutrex 20 was prepared under the following conditions:

|  | Oil Phase Feed | Water Feed | Sodium Hydroxide Solution |
|---|---|---|---|
| Temp., ° C | 65 | 18 | 18 |
| Feed Rate | 100 | 85 | 10 |

Temperature at jet outlet, ° C. =65.
Hydrocarbon content of emulsion=50% to 55%.
Rate of production, gals./min. =4.5 to 5.

Three different amounts of oleic acid (0.5%, 1.0% and 2.0%, based on the weight of Dutrex 20) were used, and sufficient sodium hydroxide was employed to give a final pH of 10.0 to 10.5 in the emulsion.

All three of the resulting emulsions were perfectly stable and showed no evidence of any settling or creaming after 72 hours. The particles in the emulsion made with only 0.5% of oleic acid were not as fine as those in the other emulsions, however, and that emulsion had a deeper yellowish color.

It was found that tall oil could be substituted for te oleic acid, giving equally good or slightly better emulsions. The tall oil was effective in the same concentration range as the oleic acid. Substitution of naphthenic acids having acid numbers less than 175, preferably acid numbers of about 100 to about 150, in amounts of 0.5% to 2.5% by weight of the Dutrex, also gives excellent emulsions by the new process.

*Example III*

The effect of the method of adding the emulsifying agent was studied in the ½-inch jet emulsifier used in Examples I and II. The conditions of operation of the jet were the same as in Example II. In one case, 2% of oleic acid was added to the Dutrex 20 feed and an equivalent amount of sodium hydroxide was added to the water injected into the outlet of the jet, according to the process of the invention. This was compared with addition of an equivalent amount of preformed sodium oleate added to the water fed by line 18, in one case, and added to the Dutrex 20 feed to line 1, in another case. The separate addition of the acid and base to the Dutrex and water, respectively, to form the emulsifying agent in the outlet of the jet gave an excellent fine, stable emulsion. Stable emulsions could not be obtained by addition of 2% of oleic acid in the form of its preformed sodium salt, regardless of the method of addition. Much larger amounts of sodium oleate, of the order of 10% to 20% by weight of the hydrocarbon, have to be added to produce successful emulsification when using the emulsifier in the preformed state. Addition of preformed emulsifier to the water phase is generally more effective than its addition with the hydrocarbon or other water-insoluble material to be emulsified but, under the most favorable conditions, usually requires amounts of emulsifier two or more times as great as is necessary when the emulsifier is formed by reaction of an acid and a base in the outlet of the dispersing jet.

It has been demonstrated that larger jets can be operated successfully in the same manner as the ½-inch jet used in the preceding examples. With a jet of 9 times the capacity, for example, excellent emulsions of Dutrex 20, having hydrocarbon concentrations of 2% to 70%, have been prepared when emulsifying 35 to 50 gallons of plasticizer per minute. A jet of 16 times the capacity of the ½-inch jet giving proportionally higher production rates has also been successfully used.

*Example IV*

A highly stable emulsion of high melting point wax was prepared using a jet of the type shown in the drawing. The paraffin wax (melting point 170° F.) containing 1.7% by weight of oleic acid was heated to 220° F. and fed at the rate of 100 parts to the jet. A potassium hydroxide solution of 2.5% concentration was fed to the jet at a rate of 55 parts by weight. A steam pressure of 45 p. s. i. g. was used. The temperature at the jet outlet was 185° F. The resulting emulsion had a wax content of 60% and a pH of 11.4. It showed no tendency toward separation on standing or dilution and is especially advantageous for addition to rubber latex intended for foam rubber manufacture.

This wax has been found especially difficult to emulsify by conventional methods even with the use of large amounts of emulsifier. Successful emulsions could not be obtained even by the use of 8.5% oleic acid and 1.5% of potassium hydroxide, based on the wax, when adding the potassium hydroxide in aqueous solution to the oleic acid-containing wax at a temperature above its melting point in a paddle type emulsifier. As a result, it has been necessary in the past to use lower melting point waxes in the manufacture of these emulsions.

It will thus be seen that the invention offers many advantages, particularly in continuous commercial scale emulsification with minimum consumption of emulsifying agents. It is capable of wide variation, not only in respect to the liquid and solid materials which may be dispersed, the liquids which can be used as dispersion media, and the acids and bases which can successfully be employed to form the dispersing agent in the process, but also in respect to the details of operation of the new process. Thus, for example, while the use of a single emulsifying jet has been illustrated in the drawing, two such units can be used in series by closing off the opening 13 of each and connecting the outlet 19 of one jet to the inlet 5 of the other, the base-containing water phase then being added through inlet 12 of the second jet. Instead of dispersing a single liquid or solid, mixtures of two or more of either or both of these may be readily dispersed by the new method. It has, for instance, been found particularly advantageous in the preparation of oil-extended carbon black master-batched synthetic rubber to add to a synthetic rubber latex a dispersion of oil extender and carbon black prepared by the process of the invention using an aqueous slurry of carbon black containing excess base as the water phase for the emulsification of the viscous oil extender, for example, Dutrex 20, and fatty acid fed, via line 1 in the drawing, to the jet emulsifier. Amounts of carbon black of the order of about 100 to 200 parts per 100 parts of extender or plasticizer can be successfully used. Other rubber-compounding ingredients, such as curing agents, fillers, reinforcing agents, antioxidants, sulfur, accelerators, etc., can be added in the same way, it being sufficient in the case of the oil-soluble compounding agents to dissolve them in the extender prior to emulsification according to the invention.

The method is successful in the production of emulsions for other industrial purposes such as metal processing oils, cutting, grinding and anticorrosion oils, or for horticultural purposes in the preparation of emulsions containing oil- or water-soluble toxic insecticidal, fungicidal or bactericidal agents which may be added to either of the respective phases before emulsification. As oil-soluble toxic materials which can be thus used, pyrethrum, aliphatic or aromatic thiocyanates, para-dichlordiphenyl trichlorethane, derris, rotenone and dinitro-orthocresol are examples. These are preferably added to the oil-acid mixture supplied by line 4 to the jet. Water-soluble bacterial compounds such as formaldehyde or toxic inorganic salts, for instance, borax, are examples of materials which can be added to the water introduced by line 18. Fungicidal compositions useful for fabric treating or wood preservation can be made by including heavy metals, for instance, copper, salts of fatty acids or naphthenic acids in the oil fed to the jet. In the preparation of these emulsions, light-lubricating oil fractions are generally useful as the oil phase, although lower boiling petroleum fractions can also be employed. Gasoline, kerosene, white spirit or chlorinated hydrocarbons can be efficiently emulsified by the new method to produce soluble oil, paste or cream emulsions useful as cleaning agents, for example, as paint cleaners, or aqueous or solvent degreasing compounds, or polishes which may be made with or without added abrasive material.

We claim as our invention:

1. A method of producing a dispersion of a finely divided material in a liquid medium in which it is incompletely miscible, which comprises injecting a stream of vapors of said liquid into a mixture of the material to be dispersed together with an acid capable of forming a surface-active salt soluble in said liquid medium to form an atomized stream of said material containing said acid together with vapors of said liquid, introducing this atomized stream directly into an opposing stream of a solution in said liquid of the base corresponding to said salt, whereby said acid and base react to form said salt in the presence of the material to be dispersed in finely divided form as a result of the combined effect of the shearing action of said injected vapors, the impact of said opposing streams and the condensation of said vapors on contact with said solution of the base, and withdrawing from the reaction zone a stable dispersion of said material in said liquid at a rate corresponding to the rate of formation of said surface-active salt.

2. A method of producing a dispersion of a finely divided material in a liquid medium in which it is incompletely miscible, which comprises injecting a stream of vapors of said liquid containing entrained atomized particles of a mixture of the material to be dispersed together with an acid capable of forming a surface-active salt soluble in said liquid medium directly into an opposing stream of a mixture of said liquid with the base corresponding to said salt at a temperature at which said vapor condenses and said acid and base react to form said salt in the presence of the material to be dispersed in finely divided form produced under the combined effect of the shearing action of said injected vapors, the impact of said opposing streams and the condensation of said vapors on contact with said base-containing liquid, and withdrawing from the reaction zone a stable dispersion of said material in said liquid at a rate corresponding to the rate of formation of said surface-active salt.

3. A method of emulsifying two incompletely miscible liquids, which comprises adding to one of the liquids an acid capable of forming a surface-active salt which is soluble in both of said liquids, heating the resulting mixture, passing the heated mixture as a confined stream together with a stream of the other of said liquids introduced therein at a higher velocity and temperature directly into an opposing stream of a solution in said other liquid of the base corresponding to said salt, whereby said acid and base react to form said salt in finely divided particles of the liquid being dispersed which particles are formed as a result of the combined effect of the shearing action of said stream of higher velocity and the impact of the opposing streams, and withdrawing from the reaction zone a stable emulsion of said liquids at a rate corresponding to removal of said surface-active salt substantially as fast as it is formed.

4. A method of emulsification in accordance with claim 3 wherein the heated mixture of liquid and added acid is passed together with vapors of the other liquid as a confined stream at a high velocity into the opposing stream of solution of the said base in said other liquid at a temperature at which condensation of said vapors takes place on contact of said opposing stream.

5. A method of producing an aqueous emulsion of a water-insoluble liquid, which comprises injecting a high velocity stream of water into a heated mixture of said water-insoluble liquid and an organic acid which forms a water-soluble salt to disperse said water-insoluble liquid in said high velocity stream of water, injecting the resulting heated dispersion as a confined stream directly into an opposing stream of an aqueous solution of a base which reacts with said acid to form a water-soluble salt in finely divided particles of said water-insoluble liquid formed as a result of the combined effect of the shearing action of said high velocity stream of water and the impact of the opposing streams, and withdrawing from the reaction zone aqueous emulsion substantially as fast as it is formed.

6. A method of producing an aqueous emulsion of a water-insoluble liquid, which comprises passing steam through a jet with a heated mixture of said water-insoluble liquid and an organic acid which forms a water-soluble salt, and injecting the thus atomized insoluble liquid directly into an opposing stream of an aqueous solution of a base which reacts with said acid to form a water-soluble salt in finely divided particles of said water-insoluble liquid formed as a result of the combined effect of the shearing action of said steam, the impact of the opposing streams, and the condensation of the steam on contact with the aqueous solution of the base, and withdrawing from the reaction zone aqueous emulsion substantially as fast as it is formed.

7. A method of emulsifying hydrocarbons in water, which comprises adding to a liquid hydrocarbon about 0.5% to 5% of a higher fatty acid, heating the mixture to between about 50° C. and about 90° C., atomizing the mixture with steam and injecting the heated mixture into an opposing stream of an aqueous solution of an alkali metal hydroxide, whereby reaction of the said fatty acid and alkali metal hydroxide takes place in finely divided hydrocarbon particles, produced as a result of the combined effect of the shearing action of the steam, the impact of the opposing streams, and the condensation of the steam on contact with the aqueous hydroxide solution, with the formation of an emulsion of said hydrocarbon stabilized by the resulting alkali metal fatty acid salt.

8. A method of emulsifying hydrocarbons in water in accordance with claim 7 wherein the rate of feed of said hydrocarbon-fatty acid mixture is proportional to the amount and temperature of the steam so that condensation of said steam is not substantial until the atomized mixture has contacted the alkali metal hydroxide solution.

9. A method of preparing emulsions suitable for use in plasticizing rubber latex, which comprises heating a mixture of a viscous liquid hydrocarbon containing about 0.5% to 5% of a higher fatty acid to between 50° C. and 80° C., injecting into the mixture steam at about 30 to about 120 p. s. i. g. in an amount such that substantial condensation of steam is avoided, forcing the mixture of steam and acid-containing liquid hydrocarbon as a confined stream through a flow-restricting zone into an opposing stream of an aqueous sodium hydroxide solution containing not more than about the stoichiometric equivalent amount of base for reaction with said fatty acid, and at a temperature such that the resulting mixture is not heated to more than about 75° C. whereby a sodium soap of the fatty acid is formed in finely divided particles of said hydrocarbon produced by thhe combined effect of the shearing action of the steam, the impact of the opposing streams, and the condensation of the steam on contact with said aqueous hydroxide solution.

References Cited in the file of this patent

UNITED STATES PATENTS

| Number | Name | Date |
|---|---|---|
| 1,317,617 | De Cew | Sept. 30, 1919 |
| 1,668,136 | Agthe | May 1, 1928 |

FOREIGN PATENTS

| Number | Country | Date |
|---|---|---|
| 11,191 | Great Britain | 1905 |